US008635368B2

(12) United States Patent
Fremantle

(10) Patent No.: US 8,635,368 B2
(45) Date of Patent: *Jan. 21, 2014

(54) METHODS, APPARATUS AND COMPUTER PROGRAMS FOR DATA COMMUNICATION EFFICIENCY

(75) Inventor: Paul Zachary Fremantle, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/463,637

(22) Filed: Aug. 10, 2006

(65) Prior Publication Data
US 2007/0043824 A1 Feb. 22, 2007

(30) Foreign Application Priority Data
Aug. 20, 2005 (GB) .................................. 0517113.7

(51) Int. Cl.
*G06F 13/00* (2006.01)
(52) U.S. Cl.
USPC ........... 709/246; 709/235; 709/234; 709/232; 709/230; 709/206
(58) Field of Classification Search
USPC ......... 709/246, 235, 234, 230, 203, 204–206, 709/232; 707/6, 10, 100
See application file for complete search history.

(56) References Cited

U.S. PATENT DOCUMENTS

| | | | | |
|---|---|---|---|---|
| 6,076,109 | A * | 6/2000 | Kikinis .......................... | 709/228 |
| 6,578,054 | B1 * | 6/2003 | Hopmann et al. ............. | 707/201 |
| 7,103,668 | B1 * | 9/2006 | Corley et al. ................. | 709/231 |
| 7,283,999 | B1 * | 10/2007 | Ramesh et al. ................... | 707/6 |
| 7,287,088 | B1 * | 10/2007 | Anderson ..................... | 709/235 |
| 7,496,604 | B2 * | 2/2009 | Sutton et al. .................. | 707/200 |
| 2003/0105716 | A1 * | 6/2003 | Sutton et al. .................... | 705/50 |
| 2003/0212690 | A1 | 11/2003 | Surma et al. | |
| 2004/0210575 | A1 * | 10/2004 | Bean et al. ........................ | 707/6 |
| 2007/0266107 | A1 | 11/2007 | Friend et al. | |

OTHER PUBLICATIONS

Neil T. Spring et al., A Protocol Independent Technique for Eliminating Redundant Network Traffic, SigCOMM, Stockholm, Sweden, 2000.
A Protocol Independent Technique for Eliminating Redundant Network Traffic, Neil T. Spring, and David Wetherall, SigCOMM, Stockholm, Sweden, 2000.

* cited by examiner

*Primary Examiner* — Kenneth R Coulter
(74) *Attorney, Agent, or Firm* — Grasso PLLC; Fred Grasso

(57) ABSTRACT

To reduce repetitive data transfers, data content of an outgoing message is stored within cache storage of an intermediate node of a data communications network. A token for identifying the cached data content is stored at the intermediate node and the sender. When a subsequent outgoing message is to be routed from a first network node to a target destination via the intermediate node, a process running at the first node checks whether the content of the message matches data cached at the intermediate node. If there is a match, a copy of the token is sent from the first node to the intermediate node instead of the data content. The token is used at the intermediate node to identify the cached data, and the cached data is retrieved from the cache and forwarded to the target destination as an outgoing message.

22 Claims, 3 Drawing Sheets

METHODS, APPARATUS AND COMPUTER PROGRAMS FOR DATA COMMUNICATION EFFICIENCY

FIELD OF INVENTION

The present invention relates to data communications, and in particular provides solutions to reduce repetitive data transfers.

BACKGROUND

Web services is a technology that is achieving wide acceptance because of its suitability for solving the problems of interoperability and integration within distributed and heterogeneous data processing networks. Web services technologies enable automation of services to Web users and Web-connected application programs, as well as collaborative business-to-business data processing operations, for services such as provision of stock prices and stock purchasing. Customer Relationship Management and storage management, for example.

A typical Web services solution includes a Web server system implementing service provision in response to service requests, using a messaging infrastructure (such as the Simple Object Access Protocol (SOAP) using XML-based messages and HTTP) and using a service discovery mechanism (for example UDDI). Web services providers often run a plurality of servers in parallel, for scalability and reliability. Service requesters then send their requests via a Web services gateway that acts as a proxy and request dispatcher for the plurality of servers. As Web services proliferate, the overall demands on network bandwidth will continue to increase and so there is a need to improve communication efficiency in Web services networks.

Publish/subscribe messaging is a known messaging technology that may be used in a Web services network and other environments. In a publish/subscribe network, one or many publisher applications send messages to the network and subscriber applications register subscriptions to indicate their interest in receiving certain types of message. If a published message matches one of the subscriptions stored for a particular subscriber, the message is passed to the subscriber. Many publish/subscribe solutions use topic-based subscriptions in which topics specified in message headers can be matched with stored topics.

Typical publish/subscribe networks store subscriptions and perform matching of messages and stored subscriptions at a message broker that is an intermediary between the publisher applications and the subscribers. By implementing routing and message transformation capabilities at a broker, or a distributed broker network, publisher and subscriber programs can be shielded from the complexities of a heterogeneous network, such that the applications are far easier to develop and maintain. Regardless of the significant advantages of simplifying communications for publisher and subscriber applications, communication overheads are significant for large messages. Some publish/subscribe solutions utilize multicast, in which a single message is routed to multiple network listeners in a network. However, not all systems support multicasting with the result that, for N subscribers, N separate Put operations are required to send the message. For a distributed broker network that does not support multicast, N messages will be sent between brokers at intermediate nodes of the network.

SUMMARY

A first aspect of the present invention saves the data content of an "outgoing message", such as a conversation-initiating request, a function call or a one-way message such as a notification, within cache storage associated with an intermediate node of a data communications network between a sender and a target destination. A token for identifying the cached data content is also stored at the intermediate node and at the sender. Conversation-initiating requests, function calls and notification messages are referred to herein as "outgoing messages" to differentiate from response messages that contain data that was retrieved from storage in response to a request. When a subsequent outgoing message is to be routed from a first network node to a target destination via the intermediate node, if a process running at the first network node identifies the content of the subsequent outgoing message as a match for date content cached at the intermediate node, a copy of the token is sent from the first network node to the intermediate node instead of sending the already-cached data content. The token is used at the intermediate node to identify the cached data content, and the cached data content is retrieved from the cache and forwarded to the target destination as an outgoing message.

The invention avoids the need to repeatedly send the full data contents from the first node to the intermediate node, reducing the message transfer overhead between these two nodes at least.

An intermediate node in the context of this specification may be a data processing system that is separate from a sender system and from a target system, or may be an intermediate computer program ('middleware') running at the target system but logically positioned between end-point applications. The sender in this context may itself be an intermediate node between the request/message originator and the target destination.

One embodiment of the invention provides a method for data communication between a first node and a second node of a data processing network, for outgoing messages such as requests and notifications. The method includes a step of deriving a token from data contents of a first outgoing message, which is sent from the first node to the second node. The token is stored in cache storage at the first node and both the token and the data contents are stored in cache storage at the second node. Prior to sending a second outgoing message from the first node to the second node, a token is derived from data contents of the second outgoing message and this token is compared with tokens held in cache storage at the first node. In response to the comparing step identifying a match, a determination is made that the matching token should be sent to the second node without sending the data contents of the second outgoing message. At the second node, the token is received and compared with cached tokens and a matching token is used to identify and retrieve the cached data contents of the first outgoing message. The second node then reuses the data contents of the first outgoing message to forward a message to its target destination, which is typically a target application program, since the second node may be a middleware program running on the target system.

As an additional optimization, the intermediate node may compare existing entries in its cache with messages that are sent in full. It may be that one intermediate node is on the path to two or more logical destinations which the broker or first node is treating as logically distinct destinations. If the intermediate node receives multiple requests to create the same Cache ID, then it can notify the broker that it is in the path of a group of target destinations. To do this, the intermediate node assigns a unique group identifier and responds to the sender with a header that associates the current destination with that group identifier. This grouping of destinations is now used by the sender to reduce the number of full data messages sent across the network.

The data contents of the message received at the target destination are indistinguishable from a conventionally transmitted outgoing message, but communications to an intermediate node have been optimized to avoid at least some repeated transfers of the same data contents.

It is well-known to cached responses (such as responses to an HTTP request), to avoid the overhead and delay of repeatedly retrieving the same data from back-end disk storage. This known enablement of optimization by caching is based on the knowledge that accessing data from disk storage is a relatively slow and computationally-expensive operation, and is based on the assumption that retrieved data is likely to be of interest again, either to the same requester or a different requester. However conventional data communications solutions have not cached out messages such as Web services requests and one-way notification messages. Since the overhead associated with generating or retrieving data for an outgoing message has already been incurred by the time the message is sent, caching outgoing messages will generally not reduce disk access operations. Furthermore, the convention matching of repeat requests with cached responses relies on the full request being repeatedly received at the node which cached the response.

Despite these significant differences between conventional request and response handling, the inventor of the present invention has recognized that a caching solution can improve performance and/or resource utilization for outgoing messages. Increasingly, status notifications and Web services requests can contain large amounts of data, and so transferring their data content across a network entails significant communication overheads and potential delays. By enabling recognition of a repeated outgoing message using a derived token, and reusing data cached at an intermediate network node, improvements in data communication performance and/or resource utilization can be achieved for outgoing message transfer.

The invention is applicable to proxy caching of status notifications and request messages at a Web services gateway in a request/response Web services environment. The invention is also applicable to message replay in a publish/subscribe messaging environment, for example for reducing the message flows between nodes of a distributed broker network, and especially for systems which do not provide full support for multicasting such that a copy of a message is required for each of a plurality of different targets.

The caching of data contents of outgoing messages may be managed to save only data contents that exceed a threshold data size or only for specific message types. In one embodiment, the token is derived from the data contents (for example, by hashing the message 'payload' which is separate from a message header) of the outgoing message and is used as a reference to a location within cache storage at the intermediate node. Such a cache-location-identifier token is referred to herein as a Cache ID for ease of reference.

A second aspect of the present invention comprises apparatus for implementing a method as described above. A first data processing apparatus comprises a sender node for use in a method of data communication between a sender node and a receiver node of a data processing network. The sender node comprises: means for deriving a token from data contents of a first outgoing message which is sent from the sender node to the receiver node; and for deriving a token from data contents of a second outgoing message, prior to sending the second outgoing message from the sender node to the receiver node; means for storing, in cache storage at the sender node, the token derived from data contents of the first outgoing message, means for comparing the token derived from data contents of the second outgoing message with tokens held in cache storage at the sender node, to identify a match, and means, responsive to the comparing identifying a match, for determining that the matching token should be sent to the receiver node without the data contents of the second outgoing message.

A second data processing apparatus comprises a receiver node for use in a method of data communication between a sender node as described above and the receiver node. The receiver node comprises: means for caching, in cache storage of the receiver node, message contents and corresponding tokens derived from the message contents, means, responsive to receipt of a token representing a required data communication between the sender node and the receiver node, for comparing the received token with tokens cached at the receiver node, to identify a match; means for retrieving, from cache storage of the receiver node in response to the comparing identifying a match, the matching cached message contents, and means for passing the retrieved message contents to a target.

The sender and receiver nodes of the first and second apparatus may be Web services gateways or publish/subscribe message brokers, and may be implemented using a JAX-RPC handler running within the gateway or broker.

BRIEF DESCRIPTION OF THE DRAWINGS

Embodiments of the invention are described below in more detail, by way of example, with reference to the accompanying drawings in which.

DETAILED DESCRIPTION

Figure 1:
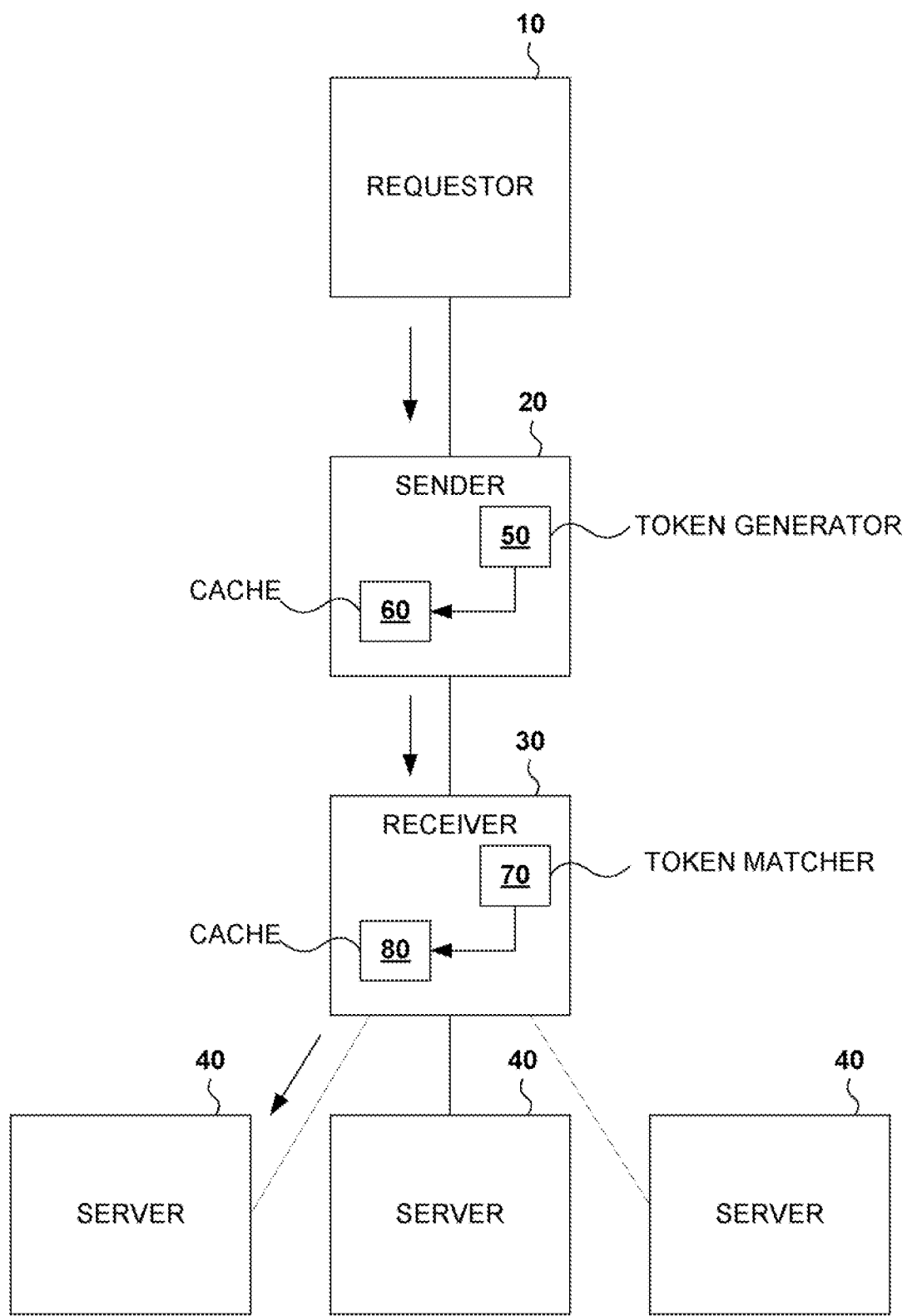
FIG. 1 is a schematic representation of a portion of a Web services network in which the present invention may be implemented.

A portion of a Web services network, represented schematically in FIG. 1, includes one or more Web services requestor systems 10 sending requests via a network to one or more Web servers 40 providing required services. Each server 40 may perform one or several processing methods, for example implemented as a set of object classes on each server that each provides a separate Web service. In the example shown in FIG. 1, the requester system 10 and servers 40 communicate with the network via respective proxies 20, 30. The proxies in this example network are intermediate data processing systems between the originating requester 10 and the service providing servers 40. The originating requester 10 and the servers 40 may be unaware that they are communicating via intermediate proxies, each implementing communications operations as if communicating directly with a target endpoint system. The intermediate node 20 is referred to hereafter as a 'sender node' because it sends Web services requests in response to the requesters 10, and the intermediate node 30 is referred to as a 'receiver' node.

The sender node 20 includes a token generator matcher 50 and cache storage 60. The receiver node 30 includes a token matcher 70 and cache storage 80. In other embodiments of the invention, the receiver node 30 also includes a token generator, but this is unnecessary in solutions which transfer generated tokens from the sender to the receiver (see below).

Figure 2:
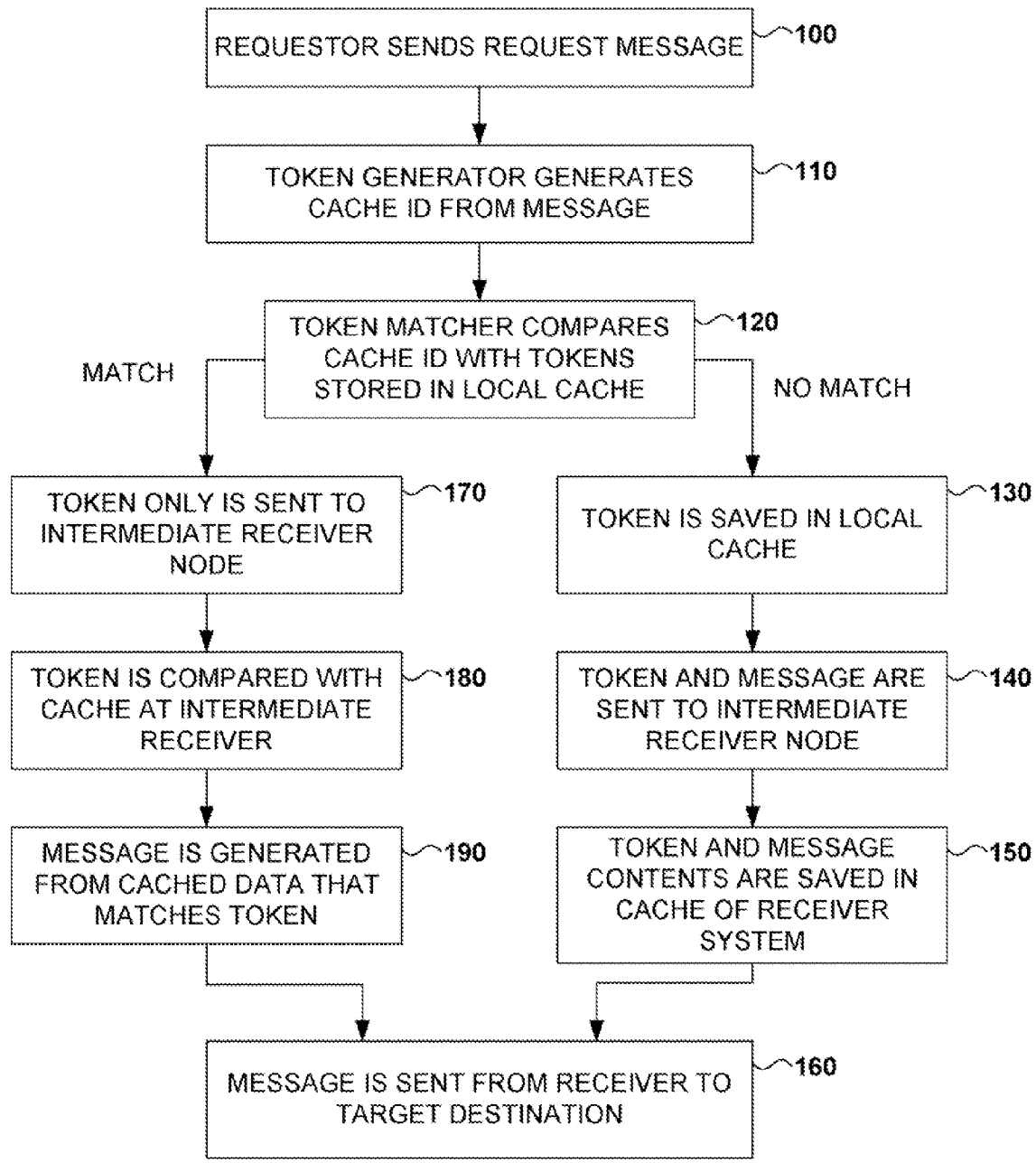
FIG. 2 shows a sequence of operations of a data communications method according to an embodiment of the invention.

FIG. 2 shows a sequence of operations performed during transfer of a Web services request from the originating requester 10 via the intermediate sender 20 and receiver 30 to the target server 40. The requester 10 sends 100 a first service request, for example a SOAP message or other HTTP request, to its proxy (the intermediate sender node 20). The token generator 50 at the intermediate sender node 20 processes the message contents to generate a token representing the message contents.

In some implementations, the token is a unique hash of the entire message (comprising the data contents of the message, or 'message payload', and header information used to identify the target for routing purposes) whereas in other embodiments the message is parsed to identify and extract the message's data contents and the token is derived from only the data contents. In some environments, the latter approach can involve slightly more analysis of the message but enables avoidance of duplicate transfers of matching message contents between two nodes even if there are differences between the originators of two messages, or differences between the targets. This avoidance of duplication despite different originators or targets has benefits, for example, in a distributed publish/subscribe broker environment in which the sender and receiver are both intermediate network nodes (as described below). The token is referred to below as a Cache ID because the tokens are saved in cache storage and used to identify matching message contents (see below).

The token matcher within the sender system's generator and matcher 50 compares 120 the newly generated Cache ID with tokens held in its local cache. A match determines that the same data contents have been transferred from this sender node before. If the Cache ID is generated by hashing the complete message including routing information then the match determines that the same data has previously been transferred between the same sender and receiver nodes. In an implementation in which only the data contents are processed to generate a Cache ID, the Cache ID is stored with an identification of the one or more receiver systems to which the message has been sent.

Failure to identify a match in the sender's cache, however, determines that the data contents or complete matching message have not previously been transferred from this node within a defined cache expiry period. Cache expiry periods are set for both the sender and receiver to ensure that a Cache ID is removed from the sender's cache at least as early as that Cache ID and associated message contents are removed from cache storage at the receiver, to avoid a match at the sender being followed by a failure to match at the receiver (see below).

The different sequences of method steps performed following a match or match failure at the sender node are described below. When no match is identified, the newly generated token is saved 130 in the local cache of the sender system. The token (Cache ID) and message are then sent 140 together to the intermediate receiver node. The token and message are saved 150 in association with each other in cache storage at the receiver node 30. For example, each token may be stored with a pointer to the corresponding message data contents. The request message is then sent 160 onwards from the intermediate receiver node 30 to the target server 40 for processing. This generation of a token and caching of tokens and data contents at the sender and receiver nodes are set-up steps that enable request transfer optimization for subsequent requests that match this first request.

When a subsequent request message is processed at the sender node to generate 110 a token and compare 120 the token with locally cached tokens, a positive match will be identified if the subsequent message matches a previously handled message (subject to the predefined cache expiry period, which limits the period of retention of information in the cache). In such a case, the complete message is not sent to the receiver node 30. Instead, either the message token alone is sent 170 in solutions in which the receiver node caches complete messages including routing information and a cache match at the sender is only identified when the complete message matches, or the token and message header information are sent together, avoiding repeatedly sending the data contents of the message.

On receipt of the token (and header information, if sent) at the receiver 30, the token is compared 180 with tokens held in cache storage 80 at the receiver node. A token match, and the pointer associated with the matching cached token, is used to identify data contents in the receiver's cache storage equivalent to the original data content of the new message, before processing by the sender to reduce repetitive data transfers. The matching data contents are retrieved from the cache and used to generate 190 a message for forwarding 160 to the target destination.

In this way, the transfer of messages between the sender and receiver intermediate nodes is optimized for repeat messages, avoiding having to resend data contents that were recently cached at the receiver node while enabling the originator and target destination of the request to perform their normal processing.

The above-described solution involves sending 140 a token and a corresponding message between the sender and receiver after a request message comparison fails to identify a match with tokens cached at the sender. In an alternative embodiment, the token is not sent with the message in this step and instead the token is generated at the receiver using the same algorithm that generated the token at the sender. This involves slightly more processing at the receiver, but a slightly reduced data transmission overhead.

Figure 3:
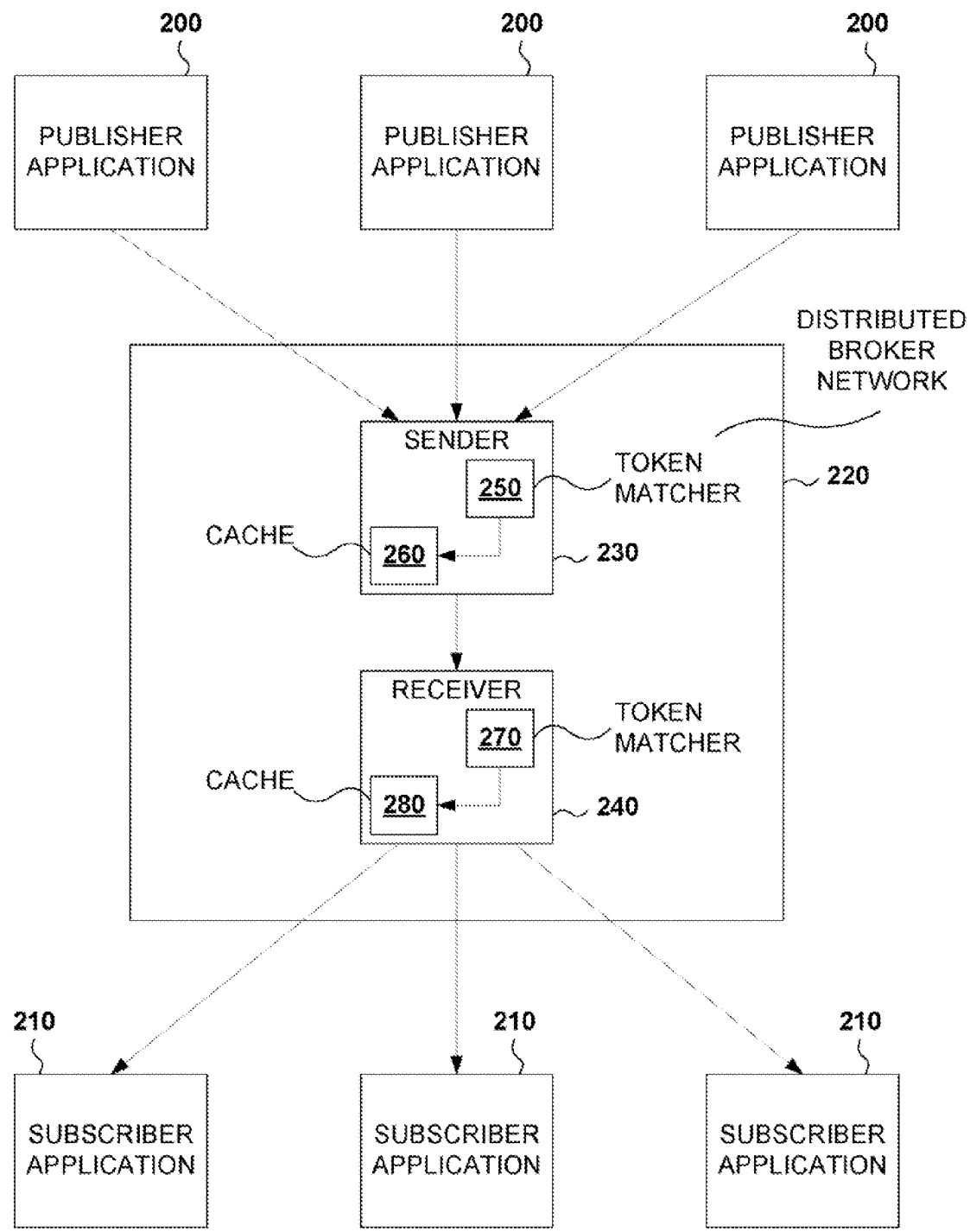
FIG. 3 is a schematic representation of a publish/subscribe messaging network in which the present invention may be implemented.

FIG. 3 is a simple schematic representation of an example publish/subscribe network. Publisher applications 200 send messages to subscriber applications 210 via a distributed broker network 220. The broker network comprises at least a sender node 230 and a receiver node 240, each comprising a message routing and transformation broker implementing publish/subscribe topic-based message filtering in response to subscriptions held within the broker network. Each of the sender and receiver nodes comprises brokers including a token matcher 250, 270 and cache storage 260, 280. The token matcher 250 on at least the sender node includes a token generator. The use of tokens for identifying avoidable repeated message transfers between the sender and receiver brokers 230, 240 is applied in a similar way to the solution described above in the context of a Web services request. However, a typical published message in a topic-based publish/subscribe messaging environment lends itself to separation of message headers from data contents and the generation of tokens from only the data contents of a message. This has the advantage of enabling identification of matching data contents for messages sent between two brokers even if two messages have different originating publishers.

The above-described solutions include at least one intermediate network node between the sender and the target destination, with caching of the contents of outgoing messages to enable a reduction of repeated data transfer. In the above examples, the intermediate node between the sender and the target destination with caching of the contents of outgoing messages to enable a reduction of repeated data transfer. In the above examples, the intermediate node may be a message broker or a Web Services gateway and may be running on a dedicated data processing system or on the same system as other 'network nodes'. Another embodiment includes sender and receiver nodes which are each middleware components such as JAX-RPC handlers, which may be running on the same system as either an originator application program or a target application program, respectively. Java™ API for XML-Based Remote Procedure Calls (JAX-RPC) is an application program interface that enables Java developers to include remote procedure calls within Web services solutions or other Web-based applications. JAX-RPC is aimed at making it easier for applications or Web services to call other applications or Web services. For example, a JAX-RPC handler may be run on a communication endpoint system or in a Web services gateway or broker node of the network. The JAX-RPC handler retains a list of which receiver nodes support caching, and which do not. This list is referred to by the handler when the sender sends an outgoing message, performing a match between messages when possible, and then sending a matched message as an empty body plus a Cache ID.

One embodiment of the invention implements caching for outgoing Web services messages in a Web services notification space. In this scenario, there is a broker and a subscriber. The broker receives market data feeds at a high rate, for example of the order of hundreds per second, and sends messages to the subscriber. Most data items within these feeds change-less frequently than the message delivery rate, but the subscriber has registered a desire to receive every message so most of the message data is repeated.

The broker finds out if this subscriber supports caching. In a first solution, the broker uses Web Services Metadata Exchange to query the policy of the subscriber and the subscriber publishes a policy, such as:

<wscache:supportsxmls:wscache="http://www.ibm.com/ns/2005/08/wscache"/>

Alternatively, the broker adds a cache header to messages when passing them on to the subscriber, with the attribute mustunderstand=true' set. If the subscriber does not support caching, the cache header will not be understood and a fault will be generated. The broker uses the information from policy and/or fault processing to maintain its internal list of which endpoints can be sent cached messages, and which cannot. This prevents the broker relying on subscriber caching of previously-transmitted contents for the next message transfer, relying instead on conventional message transfer.

As each message reaches the broker, the broker compares the message with the broker's cache. The broker has a caching policy, which may include looking at certain data elements to identify message types to be cached, or comparing with a threshold message content size, or checking the time since the previous message on this topic. The cache policy has two aspects: the data used to create the Cache ID; and the data stored against that Cache ID. The Cache ID is a unique identifier of a message's data content and is repeatably-derivable for an identical message that repeats. In a first embodiment, the message is hashed to create the Cache ID. If the hash of a new message matches a stored hash, then there is a cache hit. If not, then the cache is updated with the new data.

If the cache comparison identifies a cache hit, then the broker sends the following message to those subscribers that support caching:

```
<SOAP:Envelope>
    <SOAP:Header>
        <wsc:use id="cacheid"/>
    </SOAP:Header>
    <SOAP:Body/>
</SOAP:Envelope>
```

The broker code for implementing token generation, caching and cache comparisons (and equivalent intermediate code in non-broker implementations) is implementable as an exit or interceptor that can read and modify the messages as they pass through the network. One example implementation is a JAX-RPC handler. Another implementation is an HTTP proxy agent.

If the cache comparison fails to identify a hit, the message is sent as normal with the following header added: <wsc:update id"cacheid"/>

The broker may keep in memory a list of which destinations support caching and also the latest unique message (and cache id) that has been sent to that destination. If an intermediate node receives multiple update messages from the broker with the same Cache ID but different targets, then this indicates that the intermediate node is between the broker and multiple target destinations (e.g., subscribers). In this case, there is a further optimization which is that the broker may send the full payload once to the intermediate node, and then further subscribers will receive the message from the cache of the intermediate node. In this case the intermediate node will send back a header to the broker.

```
<SOAP:Header>
    <wsc:group id='groupid'>
        <wsa:Address>target1</wsa:Address>
        <wsa:Address>target2</wsa:Address>
    </wsc:group>
```

The broker may now group those addresses together and send a data update only once for future messages targeted at all the endpoints in the group. After sending a message to one member of the group, the broker may send <wsc:use> messages to other endpoints in the group, which will then be converted to full payloads by the intermediate node.

In one implementation, the broker sends a single message with an update header to one member of the group and then multiple further empty-bodied messages with the use header to the remaining members. In a second possible implementation, the broker may send a single message with the group identifier and the intermediate node will create n messages to the n members of the group. This relies on the messages being alike in every respect, whereas the first method allows for the same body but different headers to each target in the group.

When the subscriber receives the message, the subscriber either updates its own copy of the cache with the current message, or if there is a "use" tag, the subscriber replaces the empty body message with the cached body message.

If there is a failure (i.e. the header says use, but there is no corresponding entry in the cache), then the subscriber will report a fault back to the broker. This model works in the case where there is message pattern that supports fault reporting. Either the subscriber publishes a policy confirming its support for caching, or there must be some other out-of-band solution for confirming support for caching such as a setting at the time of registering a subscription.

In the case of a true 'one-way' message flow (i.e. not a message which initiates a two-way conversation but, for example, a notification which does not have an integrated failure response mechanism), there may be an auxiliary channel to support reporting of any faults. In case of faults in such a pure one-way solution, the subscriber needs a way of calling the broker. This could either be via an End Point Reference in the header (i.e. identifying where to send faults, which makes headers larger), or a well-known URL may be preconfigured on the broker to which reports should be sent.

This model is suitable for "best efforts" publish/subscribe, where the ordering and exactly-once (once and once-only) delivery of messages is not required. In the case of ordered and exactly-once delivery, the cache could be modified to add a version id for each cache entry, so that redelivery of old messages would become possible, but this is an unlikely requirement, as caches are typically used in scenarios where best effort is good enough.

For some security models, there may be considerably fewer cache hits, because of unique data items ("nonces") added to secured messages to prevent statistical analysis of messages. In such cases, the present invention may be deactivated. In other models in which headers are unencrypted (such as a SOAP model), the invention is workable but will not always provide the desired advantages. For this reason, the caching solution may incorporate a statistical monitoring system that informs administrators of the effectiveness of caching in a given installation. Caching can then be deactivated when desired advantages are not being achieved.

In an alternative implementation of the invention, the generation of tokens, caching of tokens and matching steps are only performed after an initial filtering step that identifies messages exceeding a predefined data size. For example, the caching system could be configured to only cache messages greater than 2 kb in size. This filtering ensures that conventional message transfer operations can then be implemented for messages below the threshold data size whereas action can be taken to avoid multiple repeated transfers of the full contents of large messages. Another embodiment applies message type filtering and the generation of tokens, caching and matching steps are performed only for a subset of message types, for example only for certain operations or service types.

One embodiment of the invention enables identification of partial matches between message data content. That is, messages which include the same data content other than a small change (i.e. the differences are less than a predefined threshold) are identified as a partial match. A Cache ID and message data contents are cached at the sender, and so the data contents are available for matching with a new message. When a partial match is identified, and the delta file calculated to represent the differences between the message contents represents only minor differences (less than a predefined threshold), the Cache ID of the earlier partially matching message contents is sent from the sender to the receiver together with the delta file.

There are numerous utilities that calculate deltas for XML files. However, there may be a further performance benefit by performing the delta calculation at a binary level. Because XML messages often share a large proportion in common due to the verbose nature of the structure of the message, there may be "delta" hits between messages that vary significantly in "business content", but the XML payload is similar. By adding a threshold under which the delta file is sent, the caching model may be optimized to support reduces network bandwidth based on the size and complexity of the message payloads.

The delta file can be built by simply comparing bytes in the stored message against bytes in the new message and building a table of the changes and the position. If the size of the table exceeds a threshold, for example 5% or 40% of the original message size, then the delta calculation can be aborted and the new message sent in total.

This delta file represents the changes to the cached earlier message contents that will result in the later message contents. The new message contents can then be recreated at the receiver from the cached earlier message contents and the delta file. This adaptable implementation enables a reduction of repeat data transfers when a subsequent message is not an exact match for an earlier cached message.

What is claimed is:

1. A method for data communication between a first node and a second node of a data processing network, the method comprising:
   deriving a token from data contents of a first outgoing message sent to a first node;
   after deriving the token for the first outgoing message,
      sending the first outgoing message and the derived token from the first node to a second node,
      storing the token in cache storage at the first node and in cache storage at the second node, and
      storing data contents of the first outgoing message in cache storage at the second node without necessarily storing corresponding data contents of the first outgoing message in cache storage at the first node; and
   prior to sending a second outgoing message from the first node to the second node,
      deriving a token from data contents of the second outgoing message,
      comparing the token derived from data contents of the second outgoing message with tokens from several different previous outgoing messages held in cache storage at the first node,
      comparing the token derived from data contents of the second outgoing message with tokens previously sent to the second node, and
      in response to comparing, identifying a matching token and sending the matching token to the second node without necessarily sending the data contents of the second outgoing message to the second node.

2. The method of claim 1, further comprising:
   prior to sending the matching token to the second node,
      checking that the second node implements a caching policy such that a matching token and data contents can be expected to be available at the second node, and
      sending the matching token if the checking step indicates that the matching token and data contents can be expected to be available.

3. The method of claim 1, further comprising:
   storing the token and the data contents in cache storage at the second node, the token uniquely identifying the data contents of the message from which the token was derived.

4. The method of claim 3, further comprising:
   responsive to receipt of a token at the second node, comparing the received token with tokens held in cache storage at the second node; and,
   in response to identifying a matching token at the second node, retrieving the data contents from cache storage at the second node.

5. The method of claim 1, wherein, for the first outgoing message, deriving a token is performed at the first node and the derived token is sent to the second node together with the first outgoing message and the first outgoing message is not concurrently stored in cache memory at the first node.

6. The method of claim 1, wherein, for the first outgoing message, deriving a token is performed by a process running at each of the first and second nodes, such that an identical token is derived at each of the first and second nodes.

7. The method claim 1, wherein deriving a token comprises hashing the data contents of an outgoing message and wherein the first outgoing message is not stored in cache memory at the first node.

8. The method of claim 1, wherein the second node is an intermediate node within a network, between an originator of an outgoing message and a target destination of the outgoing message.

9. The method of claim 1, wherein at least one of the first and second nodes is a message broker within a publish/subscribe messaging network, the message broker identifying recipients for a message by comparing messages with stored subscriptions.

10. The method of claim 1, wherein the first and second nodes are messaging middleware computer programs for handling communications between respective first and second endpoint application programs.

11. The method of claim 10, wherein the first outgoing message comprises a message header and message body, and wherein the step of deriving a token from data contents of the first outgoing message comprises hashing said message body.

12. The method of claim 1, where the token identifies the message from which the token was derived.

13. The method of claim 1, further comprising:
detecting a data size for the contents of an outgoing message; and,
deriving, storing and comparing tokens only for outgoing messages for which the detected data size exceeds a threshold.

14. The method of claim 1, further comprising:
comparing an outgoing message with a predefined set of message types; and
deriving, storing and comparing tokens only for outgoing messages which match the predefined set of message types.

15. A method for data communication between a first node and a second node of a data processing network, for outgoing messages, the method comprising:
deriving a token from data contents of a first outgoing message which is sent from a first node to a second node;
storing the derived token and the data contents in cache storage at the first node;
storing the derived token and the data contents in cache storage at the second node;
prior to sending a second outgoing message from the first node to the second node, comparing the data contents of the second outgoing message with the data contents of several different previous outgoing messages stored in cache storage at the first node;
in response to comparing, identifying a partial match, deriving a delta file representing differences between the first outgoing message and the second outgoing message; and
sending the stored token and delta file to the second node without sending the full data contents of the second outgoing message.

16. The method of claim 15 for data communication further comprising:
after receiving the stored token and the delta file at the second node, regenerating the second outgoing message at the second node and sending the regenerated second outgoing message from the second node to a third node, the third node an intermediary network node.

17. A data processing apparatus comprising a sender node for use in a method of network data communication, for an originating requestor, between a sender node and a receiver node of a data processing network, the sender node comprising:
means for deriving a token,
the means for deriving, deriving a token from data contents of a first outgoing message which is sent from the sender node to the receiver node, the token identifying the first outgoing message from which the token was derived, the token being derived before the first message is sent, and
the means for deriving, deriving a token from data contents of a second outgoing message prior to sending the second outgoing message from the sender node to the receiver node, the token derived from data contents of the first outgoing message;
means for comparing the token derived from data contents of the second outgoing message with tokens from several different previous outgoing messages held in cache storage at the sender node, to identify a match; and
means, responsive to the comparing identifying a match, for determining that the matching token should be sent to the receiver node without the data contents of the second outgoing message,
wherein the cache storage at the sender node does not necessarily retain the data contents of the first outgoing message after sending the derived token from data contents of the first outgoing message.

18. A publish subscribe data communication network comprising:
a first data processing apparatus comprising a network intermediary sender node; and
a second data processing apparatus comprising a network intermediary receiver node, the sender node and the receiver node for use in a method of data communication between a network publisher and an end user subscriber to the network publisher, wherein the receiver node comprises:
means for caching, in cache storage of the receiver node, message contents and corresponding tokens derived by a sender node from said message contents;
means, responsive to receipt of a token derived by a sender node and representing a required data communication between the sender node and the receiver node, for comparing the received token with tokens from several different previous outgoing messages cached at the receiver node, to identify a match;
means for retrieving, from cache storage of the receiver node in response to the comparing identifying a match, the matching cached message contents; and
means for passing the retrieved message contents to another network intermediary and towards the end user subscriber.

19. A method for data communication between a first node and a second node of a data processing network for outgoing messages, the method comprising:
deriving a token from data contents of a first outgoing message, where the outgoing message is sent from a first node to a second node;
storing the token in cache storage at the first node;
prior to sending a second outgoing message from the first node to the second node, deriving a token from data contents of the second outgoing message and comparing the token derived from data contents of the second outgoing message with tokens from several different previous outgoing messages held in cache storage at the first node; and in response to comparing, identifying a matching token and sending the matching token to the second node instead of sending the data contents of the second outgoing message;

wherein, for a set of outgoing messages sent from the first node to the second node, for which set of outgoing messages the comparing identifies a single matching token, defining the target destinations of the set of outgoing messages as a group; and for a subsequent outgoing message sent from the first node to a first member of the group, deriving a second token from data contents of the subsequent outgoing message, storing the second token and identification of the group in cache storage at the first node, storing the second token and data contents of the subsequent outgoing message in cache storage at the second node, and sending the second token to the second node with an instruction to forward an outgoing message to the members of the group other than the first member.

20. The method of claim 19, further comprising:

responsive to receipt of the second token and instruction at the second node, forwarding an outgoing message, including the data contents of the subsequent outgoing message, to the members of the group other than the first member.

21. A method for data communication between a first node and a second node of a data processing network for outgoing messages, the method comprising:

deriving a token from data contents of a first outgoing message which is sent from a first node to a second node;

storing the token and the data contents in cache storage at the first node; storing the token and the data contents in cache storage at the second node;

prior to sending a second outgoing message from the first node to the second node, comparing the data contents of the second outgoing message with the data contents of several different previous outgoing messages stored in cache storage at the first node;

in response to comparing, identifying a partial match, deriving a delta file representing differences between the first outgoing message and the second outgoing message;

comparing the size of the delta file with a threshold size and determining whether the identified partial match should be accepted based on the delta file size comparison; and for a partial accepted match, sending the stored token and delta file to the second node without sending the full data contents of the second outgoing message, for a non-accepted partial match, sending the complete message contents to the second node.

22. The method claim 21 wherein the first node is an intermediary node in the network, the intermediary node acting between and separate from a publisher and an end user subscriber.

* * * * *